US010761719B2

(12) United States Patent
Corrado et al.

(10) Patent No.: US 10,761,719 B2
(45) Date of Patent: Sep. 1, 2020

(54) USER INTERFACE CODE GENERATION BASED ON FREE-HAND INPUT

(71) Applicant: Microsoft Technology Licensing, LLC, Redmond, WA (US)

(72) Inventors: Alexander J. Corrado, Boston, MA (US); Xiao Tu, Medina, WA (US); Benjamin J. Fersenheim, Charlestown, MA (US); George Fitzgerald Matthews, Boston, MA (US); Jeremie Laval, Somerville, MA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 172 days.

(21) Appl. No.: 15/808,669

(22) Filed: Nov. 9, 2017

(65) Prior Publication Data

US 2019/0138197 A1  May 9, 2019

(51) Int. Cl.
*G06F 3/048* (2013.01)
*G06F 3/0488* (2013.01)
*G06F 3/0354* (2013.01)
*G06F 9/451* (2018.01)
*G06F 8/38* (2018.01)

(52) U.S. Cl.
CPC ...... *G06F 3/04883* (2013.01); *G06F 3/03545* (2013.01); *G06F 8/38* (2013.01); *G06F 9/451* (2018.02)

(58) Field of Classification Search
None
See application file for complete search history.

(56) References Cited

U.S. PATENT DOCUMENTS

| 4,972,496 | A | 11/1990 | Sklarew |
| 6,351,777 | B1* | 2/2002 | Simonoff ............... H04L 29/06 709/249 |
| 7,136,082 | B2* | 11/2006 | Saund ............... G06K 9/00409 345/619 |

(Continued)

FOREIGN PATENT DOCUMENTS

WO   2005038648 A1   4/2005

OTHER PUBLICATIONS

Caetano, et al., "JavaSketchIt: Issues in Sketching the Look of User Interfaces", In AAAI Technical Report SS-02-08, Mar. 2002, 6 Pages.

(Continued)

*Primary Examiner* — Hua Lu
(74) *Attorney, Agent, or Firm* — Workman Nydegger (57) ABSTRACT

Platform-specific user interface (UI) objects may be generated based on received free hand input. In response to receiving free hand input, the received free hand input is analyzed. Based on the analysis of the received free hand input, one or more elements associated with the free hand input are identified. The one or more elements can comprise shapes or text corresponding to the received free hand input. For each of at least one of the one or more elements, the one or more elements are analyzed. Analyzing the at least one element may comprise analyzing a context of the at least one element. A UI object corresponding to the at least one element is determined. Executable platform-specific UI code associated with the determined UI object is generated.

24 Claims, 6 Drawing Sheets

(56) References Cited

U.S. PATENT DOCUMENTS

| | | | | |
|---|---|---|---|---|
| 7,483,017 B2* | 1/2009 | Silverman | G06K 9/00402 | 345/179 |
| 9,430,140 B2* | 8/2016 | Reuschel | G09B 5/02 | |
| 2003/0142106 A1* | 7/2003 | Saund | G06K 9/00463 | 345/582 |
| 2003/0142112 A1* | 7/2003 | Saund | G06K 9/00409 | 345/619 |
| 2004/0090439 A1* | 5/2004 | Dillner | G06K 9/00402 | 345/440 |
| 2005/0093868 A1* | 5/2005 | Hinckley | G06F 3/011 | 345/502 |
| 2006/0067576 A1* | 3/2006 | Marggraff | G06F 3/03545 | 382/186 |
| 2006/0080609 A1* | 4/2006 | Marggraff | G06F 3/03545 | 715/727 |
| 2006/0127872 A1* | 6/2006 | Marggraff | G06F 3/03545 | 434/353 |
| 2008/0231635 A1* | 9/2008 | Saund | G06K 9/00416 | 345/440 |
| 2011/0041102 A1* | 2/2011 | Kim | G06F 3/04883 | 715/863 |
| 2011/0066984 A1* | 3/2011 | Li | G06F 3/04883 | 715/863 |
| 2012/0229425 A1* | 9/2012 | Barrus | G06F 3/04883 | 345/179 |
| 2013/0047093 A1* | 2/2013 | Reuschel | G06F 3/1454 | 715/753 |
| 2013/0305146 A1* | 11/2013 | Hashiba | G06K 9/00979 | 715/255 |
| 2014/0035844 A1* | 2/2014 | Zhang | G06F 3/04883 | 345/173 |
| 2014/0055400 A1* | 2/2014 | Reuschel | G06F 9/452 | 345/173 |
| 2014/0096092 A1* | 4/2014 | Johnson | G06F 3/0481 | 715/863 |
| 2014/0245120 A1* | 8/2014 | Schwartz | G06K 9/00449 | 715/226 |
| 2016/0034151 A1* | 2/2016 | Yang | G06F 3/04817 | 715/765 |
| 2016/0034441 A1* | 2/2016 | Nguyen | G06F 40/103 | 715/234 |
| 2016/0092728 A1* | 3/2016 | Tsutsui | G06F 40/171 | 715/268 |
| 2016/0139691 A1* | 5/2016 | Li | G06F 3/0304 | 345/179 |
| 2017/0060406 A1* | 3/2017 | Rucine | G06F 3/0236 | |
| 2017/0060821 A1* | 3/2017 | Rucine | G06K 9/00402 | |
| 2017/0109032 A1* | 4/2017 | MeLinand | G06K 9/00402 | |
| 2017/0153806 A1* | 6/2017 | Rucine | G06F 3/04883 | |
| 2018/0018533 A1* | 1/2018 | Taranta, II | G06K 9/00416 | |
| 2018/0136912 A1* | 5/2018 | Venkataramani | G06F 8/35 | |
| 2018/0173688 A1* | 6/2018 | Melinand | G06T 11/206 | |

OTHER PUBLICATIONS

Landay, et al., "Sketching Interfaces: Toward More Human Interface Design", In Journal of Computer, vol. 34, Issue 3, Mar. 2001, pp. 56-64.

"International Search Report and Written Opinion Issued in PCT Application No. PCT/US2018/058817", dated Feb. 19, 2019, 12 Pages. (MS# 403150-WO-PCT).

"BerndK/SvgToXaml", Retrieved From <<https://github.com/BerndK/SvgToXaml>>, Retrieved on: Sep. 14, 2017, 3 Pages.

"Vector Magic", Retrieved From <<https://vectormagic.com/>>, Retrieved on: Sep. 14, 2017, 16 Pages.

Bello, Antonio, "iOS User Interfaces: Storyboards vs. NIBs vs. Custom Code", Retrieved From <<https://www.toptal.com/ios/ios-user-interfaces-storyboards-vs-nibs-vs-custom-code>>, Apr. 9, 2014, 23 Pages.

Crump, Michael, "Windows Ink 1: Introduction to Ink and Pen", Retrieved From <<https://blogs.windows.com/buildingapps/2016/11/21/windows-ink-1-introduction-to-ink-and-pen/>>, Nov. 21, 2016, 7 Pages.

Koren, et al., "Recognize Windows Ink strokes as text and shapes", Retrieved From <<https://docs.microsoft.com/en-us/windows/uwp/input-and-devices/convert-ink-to-text>>, Feb. 8, 2017, 20 Pages.

* cited by examiner

USER INTERFACE CODE GENERATION BASED ON FREE-HAND INPUT

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. As such, the performance of many computing tasks has become distributed across a number of different computer systems and/or a number of different computer environments.

Development for user interfaces (UI's) of software programs that are executable on such computer systems have generally included individuals having different skills involved for various portions of UI development. For instance, such development has included designers that create UI prototypes on paper, whiteboards, and so forth. These prototypes may include various iterations or refinements with various designers before eventually passing the prototypes to UI developers. The UI developers may then use the prototypes to create executable UI code, which created UI code may further include various iterations or refinements between the designers and developers.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to generating platform-specific user interface (UI) objects based on received free hand input. For example, embodiments may include, in response to receiving free hand input, performing a number of steps, including analyzing the received free hand input. Embodiments may further include, based on the analysis of the received free hand input, identifying one or more elements associated with the free hand input. For each of at least one of the one or more elements, the at least one element may be analyzed. Embodiments may also include determining a UI object corresponding to the at least one element, and generating executable platform-specific UI code associated with the determined UI object.

In this way, free hand input, such as free hand strokes (e.g., with a stylus) at a touchscreen, may first be analyzed to identify elements (e.g., shapes, text, and so forth). These elements may then be analyzed to identify UI objects corresponding to the identified UI elements, which identified UI objects may then be utilized to generate platform-specific UI code. Accordingly, the principles described herein comprise a technical solution (i.e., based on analysis of received free hand input, identifying elements, followed by identifying UI objects, and eventually generating platform-specific UI code that is usable to create/refine UI's for software applications to be executed on a particular platform) to a technical problem that includes allowing users (e.g., designers) to automatically create platform-specific UI code based on prototypes/sketches.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein relate to generating platform-specific user interface (UI) objects based on received free hand input. For example, embodiments may include, in response to receiving free hand input, performing a number of steps, including analyzing the received free hand input. Embodiments may further include, based on the analysis of the received free hand input, identifying one or more elements associated with the free hand input. For each of at least one of the one or more elements, the at least one element may be analyzed. Embodiments may also include determining a UI object corresponding to the at least one element, and generating executable platform-specific UI code associated with the determined UI object.

In this way, free hand input, such as free hand strokes (e.g., with a stylus) at a touchscreen, may first be analyzed to identify elements (e.g., shapes, text, and so forth). These elements may then be analyzed to identify UI objects corresponding to the identified UI elements, which identified UI objects may then be utilized to generate platform-specific UI code. Accordingly, the principles described herein comprise a technical solution (i.e., based on analysis of received free hand input, identifying elements, followed by identifying UI objects, and eventually generating platform-specific UI code that is usable to create/refine UI's for software applications to be executed on a particular platform) to a technical problem that includes allowing users (e.g., designers) to automatically create platform-specific UI code based on prototypes/sketches.

Some introductory discussion of a computing system will be described with respect to FIG. 1. Then generating platform-specific UI objects based on received free hand input will be described with respect to FIGS. 2 through 6.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
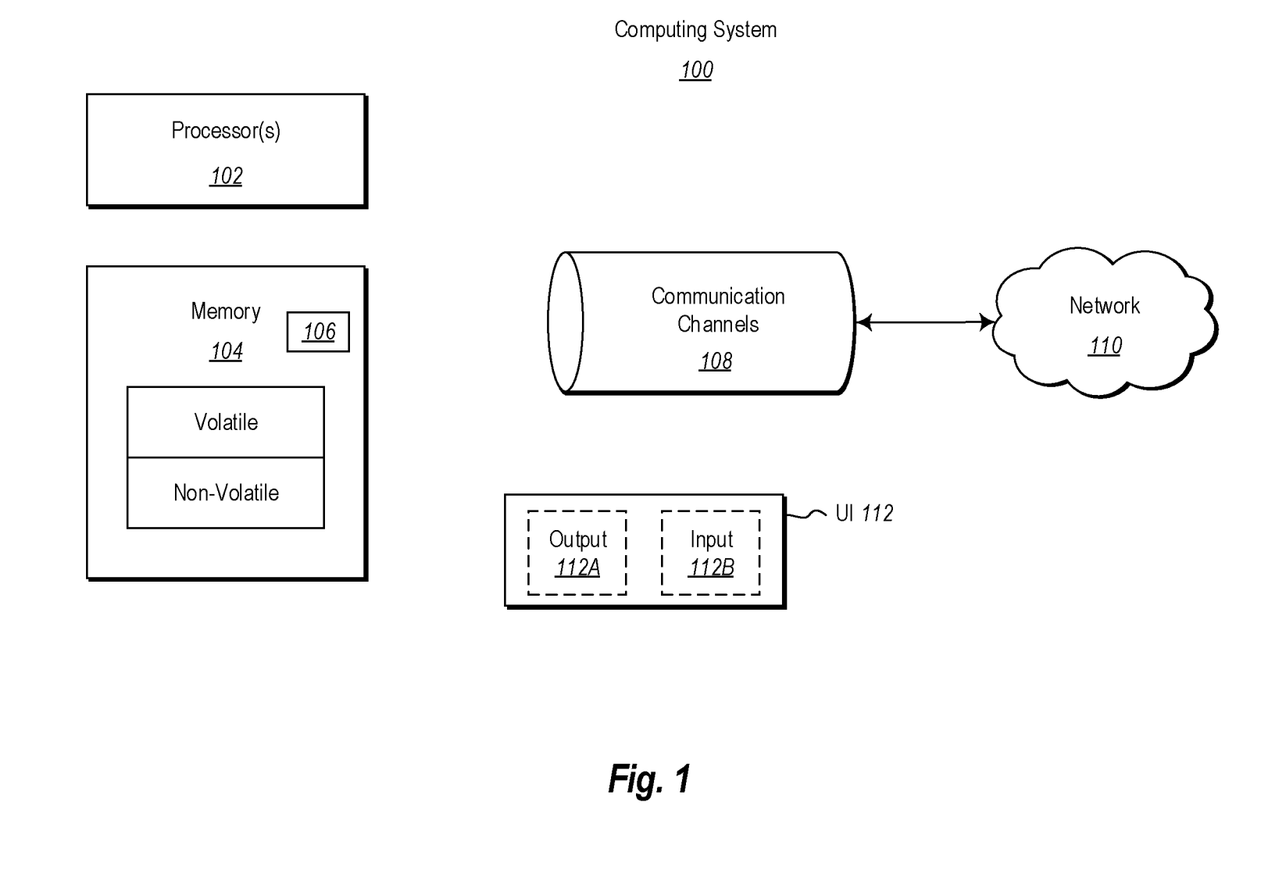
FIG. 1 illustrates an example computer architecture that facilitates operation of the principles described herein.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "control", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
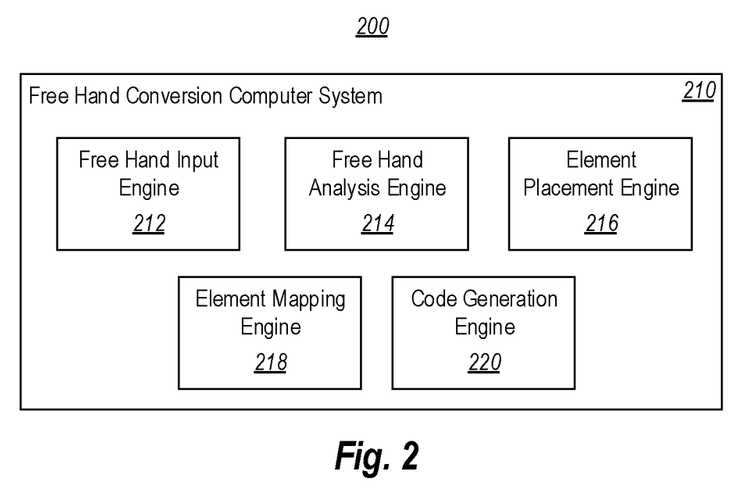
FIG. 2 illustrates an example environment for generating platform-specific user interface (UI) objects based on received free hand input.

FIG. 2 illustrates a computer environment 200 for converting free hand input into platform-specific UI code. As illustrated, the computer environment 200 includes free hand conversion computer system 210. The free hand conversion computer system may correspond to the computer system 100, as described with respect to FIG. 1. The free hand conversion computer system 210 may comprise any type of computer system that is configured to convert received free hand input into platform-specific UI code, as further described herein. In an example, the free hand conversion computer system 210 may comprise a desktop computer, a laptop computer, a tablet, a smartphone, and so forth. Furthermore, the free hand conversion computer system 210 may be running any applicable operating system, including but not limited to, MICROSOFT® WINDOWS®, APPLE® MACOS®, APPLE IOS®, GOOGLE™ CHROME OS™, ANDROID™, and so forth.

As illustrated, the free hand conversion computer system 210 may include various engines, functional blocks, and components, including free hand input engine 212, free hand analysis engine 214, element placement engine 216, element mapping engine 218, and code generation engine 220. The various engines, components, and/or functional blocks of the free hand conversion computer system 210 may be implemented on a local computer system or may be implemented on a distributed computer system that includes elements resident in the cloud or that implement aspects of cloud computing (i.e., at least one of the various illustrated engines may be implemented locally, while at least one other engine may be implemented remotely). The various engines, functional blocks, and/or components of the free hand conversion computer system 210 may be implemented as software, hardware, or a combination of software and hardware.

Notably, the configuration of free hand conversion computer system 210 illustrated in FIG. 2 is shown only for exemplary purposes. As such, the free hand conversion computer system 210 may include more or less than the engines, functional blocks, and/or components illustrated in FIG. 2. For instance, the element mapping engine 218 may be split into two engines, including a first engine responsible for identifying UI objects corresponding to recognized shapes and a second engine responsible for analyzing elements to identify transitions, as the engines 212 through 220 are further described herein. In another example, the free hand analysis engine 214 and the element mapping engine 216 may be combined to form a single engine that is configured to perform the responsibilities of both the free hand analysis engine and the element mapping engine, as the engines 212 through 220 are further described herein. Although not illustrated, the various engines of the free hand conversion computer system 210 may access and/or utilize a processor and memory, such as the processor 102 and the memory 104 of FIG. 1, as needed to perform their various functions.

As briefly described, the free hand conversion computer system includes free hand input engine 212, free hand analysis engine 214, element placement engine 216, element mapping engine 218, and code generation engine 220. The free hand input engine 212 may comprise a mechanism that allows free hand input from a user for further analysis, and ultimately UI code generation. Such a mechanism may comprise any applicable hardware and/or software. In an example, such a mechanism may comprise a laptop having a touchscreen (i.e., hardware) and a software application (i.e., software) including a canvas that receives free hand input (e.g., a software application that utilizes WINDOWS INK®).

Free hand input may comprise any applicable type of free hand strokes (i.e., collections of one or more handwritten strokes) received at the free hand conversion computer system 210. Such input may include handwriting using any applicable tool (e.g., a finger, a mouse, a passive stylus, an active stylus, a mouse, and so forth). In some embodiments, free hand input may also include a picture taken of free hand input. For instance, an individual may sketch a UI layout on a whiteboard, which UI layout may be captured as a picture in any appropriate format (e.g., .pdf, .jpeg, .jpg, .gif, .png, .tiff, and so forth). The captured picture may then be input at the free hand input engine 212.

Figure 3A:
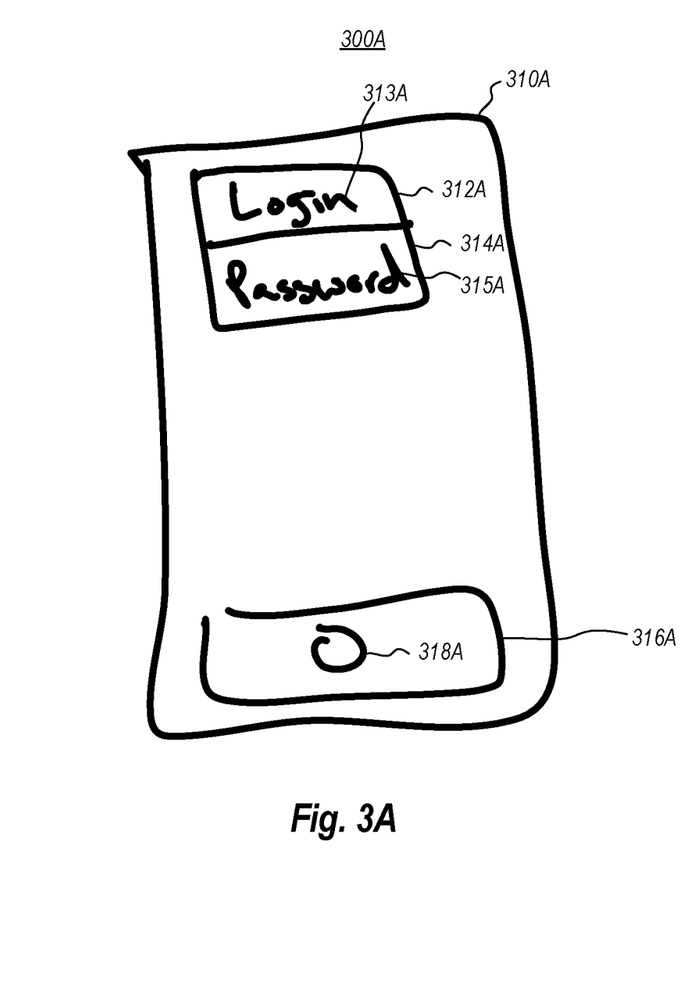
FIGS. 3A and 3B illustrate an example of identified elements based on received free hand input.
Figure 3B:
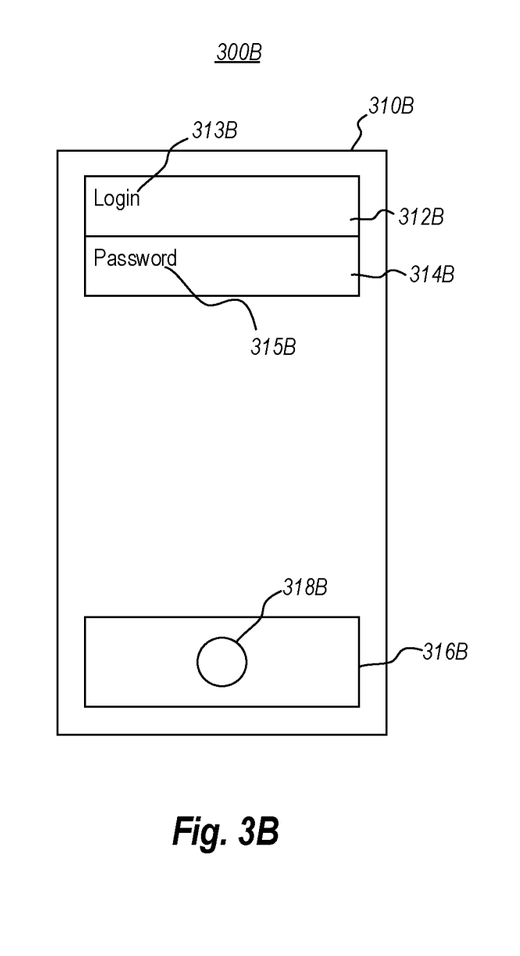

Regardless of the type of free hand input received at the free hand input engine 212, the free hand analysis engine 214 may be configured to analyze the received free hand input (i.e., collection(s) of one or more handwritten strokes). For instance, the free hand analysis engine may analyze received free hand input to identify/recognize one or more formalized elements associated with the received input. For instance, such formalized elements may comprise shapes (e.g., square, rectangle, triangle, cube, and so forth), letters, words, icons, and so forth. FIGS. 3A and 3B illustrate an exemplary embodiment. Additionally, the free hand analysis engine may also be configured to identify colors, line widths, font types, font sizes, and so forth, associated with free hand input. Accordingly, in such embodiments, the free hand input engine may allow for user selection of colors, line widths, and so forth.

Figure 4A:
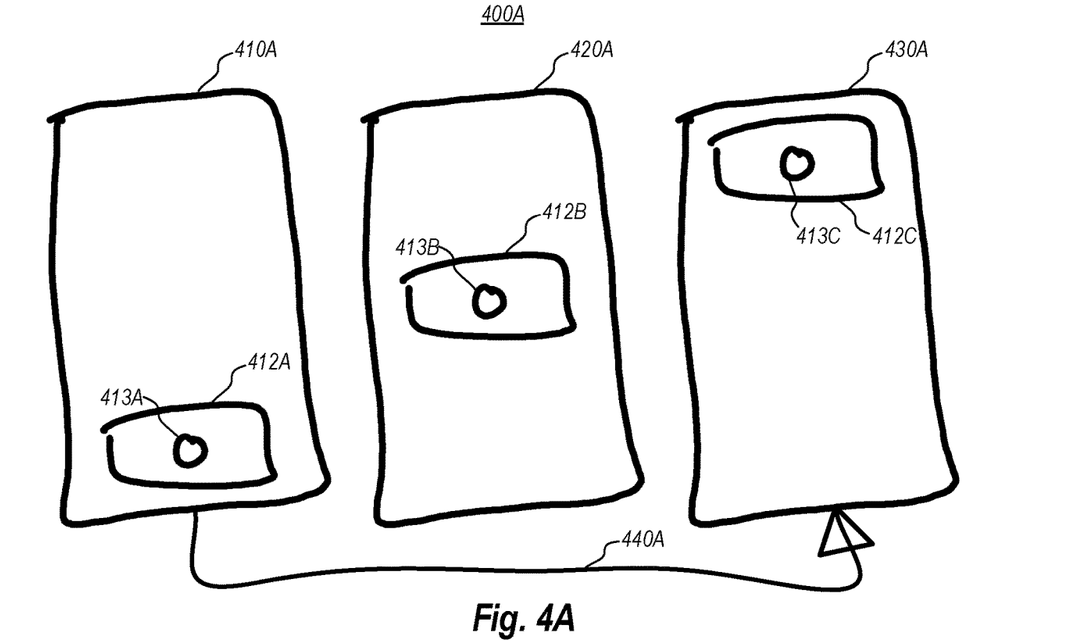
FIGS. 4A and 4B illustrate an example of identified transitions based on free hand input.
Figure 4B:
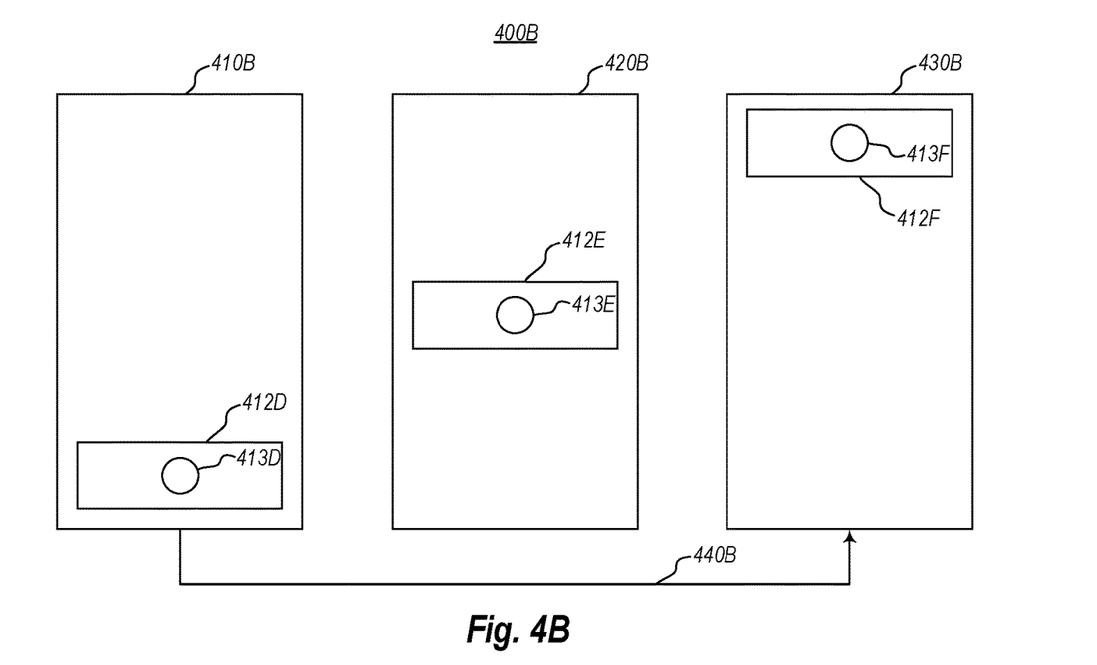

As illustrated, FIG. 3A comprises a combination of received free hand input 300A. More specifically, FIG. 3A includes a large free hand rectangle 310A, a first small rectangle 312A that includes handwritten text 313A (i.e., handwritten text of "Login"), a second small rectangle 314A that includes handwritten text 315A (i.e., handwritten text of "Password"), and a third small rectangle 316A that includes a circle 318A. In response to receiving the free hand input 300A of FIG. 3A, the free hand analysis engine 214 may perform an analysis (i.e., of the received input) and identify one or more formalized elements that each correspond to one or more shapes and/or portions of text associated with the received free hand input. Upon performing such identification/recognition, the free hand analysis engine may also display a formalized version of the identified elements (i.e., shapes and/or text). For instance, FIG. 3B illustrates an exemplary formalized version 300B of the received free hand input 300A of FIG. 3A. More specifically, as shown in FIG. 4B, the free hand analysis engine may, via analysis of the received free hand input 300A, identify that the large rectangle 310A indeed corresponds to a formalized large rectangular element 310B that includes three formalized smaller rectangular elements (i.e., element 312B, element 314B, and the element 316B), formalized text 313B within the formalized rectangular element 312B (i.e., "Login"), formalized text 315B within the formalized rectangular element 314B (i.e., "Password"), and a formalized circle 318B within the formalized rectangular element 316B.

Notably, in some embodiments, the free hand analysis engine may determine a probability associated with a likelihood of particular free hand input corresponding to a particular shape, to particular text, and so forth. In an example, the free hand analysis engine may determine with 98% certainty that the received rectangular input 310A does indeed comprise a large rectangular shape/element. The free hand analysis engine may further include such probabilities as metadata associated with each identified element for future use by the element mapping engine, as further described herein. Additionally, the free hand analysis engine may also generate metadata associated with one or more characteristics of each identified element. For instance, such characteristics metadata may include information related to size, shape, relative positioning (i.e., element positioning relative to other elements), color, line width, font type, font size, and so forth, of an identified element.

Upon performing such identification/recognition, the free hand analysis engine may generate and display (e.g., via a UI of a software application of the free hand conversion computer system 210) a formalized version 300B of the free hand input 300A, including the formalized large rectangular element 310B, formalized small rectangular element 312B having formalized text 313B (i.e., "Login"), formalized rectangular element 314B having formalized text 315B (i.e., "Password"), and formalized rectangular element 316B having formalized circular element 318B. In this way, the free hand conversion computer system 210 may thus allow a user to identify that the free hand input 300A was correctly identified/recognized by the free hand analysis engine 214 and make any changes, if appropriate.

Notably, while the example illustrated in FIGS. 3A and 3B shows recognition of only text, rectangles, and circles, the free hand analysis engine 214 may be configured to identify essentially any shape (e.g., squares, triangles, octagons, hexagons, and, so forth), text, letter, icon, character, and so forth. Additionally, while the examples described herein (e.g., FIGS. 3A and 3B) are generally related to the recognition of two dimensional (2D) elements, the free hand analysis engine may also be configured to identify three dimensional (3D) elements, including shapes, text, icons, and so forth.

Upon recognition of shapes, text, and so forth, by the free hand analysis engine 214, the element placement engine 216 may determine a location/placement of each formalized element in relation to each of the other elements. For instance, the element placement engine 216 may determine a location of the large rectangular element 310B with respect to each of the rectangular element 312B, the rectangular element 314B, and the rectangular element 316B. Continuing the example of FIG. 3B, the element placement engine may determine the location of the formalized text 313B in relation to the rectangular element 312B, the location of the formalized text 315B in relation to the rectangular element 314B, and the location of the circular element 318B in relation to the rectangular element 316B.

Upon recognition of elements (i.e., by the free hand analysis engine 214) associated with received free hand input and relative positioning of such elements (i.e., by the element placement engine 216), the element mapping engine 218 may be configured to identify UI objects that correspond to the recognized/identified elements. For instance, using the example of FIG. 3B, the element mapping engine may use context associated with the elements recognized by the free hand analysis engine, including the combination of elements (e.g., elements 312B through 318B) within the large rectangular element 310B and the size and shape of the large rectangular element 310B, to determine that the element 310B corresponds to a UI object comprising an entire view (e.g., a welcome view, a login view, a landing page of an application, and so forth) or an entire page of a user interface of a potential application. Accordingly, such context may include one or more types of identified elements (e.g., shapes, text, and so forth), sizes of identified elements, combinations of identified elements, positioning of elements, metadata corresponding to identified elements (e.g., probability metadata, characteristics metadata), and so forth, which context may be used to identify suitable UI objects corresponding to identified elements (as well as transitions/animations, as further described herein).

Likewise, the element mapping engine 216 may use context to determine that the rectangular element 312B corresponds to a UI object comprising a login text box that is configured to receive login information (e.g., a username or email address) based on at least the corresponding identified shape, determined positioning, and identified text (e.g., "Login") of the element 312B. Similarly, the element mapping engine 216 may use context to determine that the rectangular element 314B corresponds to a UI object comprising a login text box that is configured to receive password information associated with a login of a user based on at least the corresponding identified shape, determined positioning, and identified text (e.g., "Password") of the element 314B.

Finally, the element mapping engine 216 may determine that the rectangular element 316B corresponds to a UI object comprising a user-selectable button that is configured to receive input (e.g., via mouse input, touch input, and so forth) associated with a login of a user based on context, including the identified shape of the element 316B (e.g., identified type of element), any probability metadata associated with the element 316B, and/or the position of the element 316B in relation to other elements (e.g., the circular element 318B included within the element 316B). Accordingly, utilizing context, the element mapping engine may determine/identify a particular UI object that corresponds to each element recognized/identified by the free hand analysis engine. In particular, the element mapping engine may utilize heuristics and/or machine learning to intelligently analyze any context associated with identified elements (i.e., elements based on received free hand input) in order to determine a suitable UI object that corresponds to each identified element.

Notably, FIG. 3B is only one example of the types of UI objects that may be identified as corresponding to recognized elements based on received free hand input. More specifically, the principles described herein may be utilized to identify virtually any type of UI object based on received free hand input. For instance, such UI objects may comprise views/pages, text boxes, selectable objects (e.g., buttons), objects capable of receiving input (e.g., login object or password object), and so forth. Additionally, while FIGS. 3A and 3B (and FIGS. 4A through 5B) only illustrate and discuss identified 2D elements and 2D UI objects that correspond to the identified elements, 3D UI objects may also be identified as suitable UI objects corresponding to identified elements (e.g., 3D elements) recognized by the element mapping engine. In some embodiments, regardless of whether the UI objects are 2D or 3D, the UI objects may comprise generic UI objects (e.g., a generic UI view, a generic UI text box, and so forth) that can be converted into platform-specific UI code, as further described herein.

Notably, the element mapping engine may have access to a store of possible generic UI elements. In such embodiments, the element mapping engine may correlate the elements identified by the free hand analysis engine to the store of all possible generic UI elements based at least partially on matching characteristics of the identified elements in comparison to corresponding UI objects. As briefly described, the free hand analysis engine may include metadata comprising one or more identified characteristics with each identified element, such that the element mapping engine may identify appropriate generic UI objects for each identified/recognized object based at least partially on one or more matching (e.g., similar characteristics, exact characteristics, compatible characteristics, and so forth) characteristics of the both a given identified element and the identified corresponding UI object. In other embodiments there may be a finite number of elements that can be identified by the free hand analysis engine and the element mapping engine may map each of the possible elements to a generic UI element such that the element mapping engine can immediately identify a corresponding generic UI object for each element recognized by the free hand analysis engine based on received free hand input.

Additionally, while the element mapping engine has been described as identifying particular UI objects associated with recognized elements, the element mapping engine 218 may also be configured to identify transitions based on received free hand input. FIGS. 4A and 4B illustrate an embodiment for identifying transitions (e.g., animations) from a first identified UI view to a second identified UI view. Initially, the free hand input engine 412 may receive free hand input 400A as shown in FIG. 4A. Upon receiving the free hand input 400A, the free hand analysis engine 214 may identify that rectangle 410A comprises a large rectangular element 410B having small rectangular element 412D and small circular element 413D, rectangle 420A comprises a large rectangular element 420B having small rectangular element 412E and small circular element 413E, rectangle 430A comprises a large rectangular element 430B having small rectangular element 412F and small circular element 413F, and arrow 440A comprises formalized arrow element 440B. These recognized elements (e.g., large rectangular element 410B, small rectangular element 412D, and so forth) may then be analyzed by the element mapping engine to identify both one or more UI objects and transitions between UI objects that were identified as comprising a UI view.

Initially, the element mapping engine may identify UI objects associated with the identified elements (e.g., rectangular element 410B, rectangular element 412D, and so forth), as further described herein. Using FIG. 4B as an example, the element mapping engine may identify that rectangular element 410B and rectangular element 430B both correspond to UI objects comprising a view, while the rectangular element 420B comprises a transition state associated with transitioning from a first view (e.g., element 410B) to a second view (e.g., element 430B) based on intelligence (e.g., heuristics, machine learning, and so forth) of the element mapping engine and free hand conversion computer system.

For instance, the element mapping engine may perform an intelligent analysis of the formalized elements 400B, including identifying that the arrow element 440B points from the rectangular element 410B to the rectangular element 430B (i.e., the arrow bypasses the rectangular element 420B) and that the rectangular element 412 (i.e., element 412D through element 412F)/circular element 413 (i.e., element 413D through element 413F) moves from the bottom of the rectangular element 410B to the middle of the rectangular element 420B to the top of the rectangular element 430B (i.e., potentially indicating a transition and/or animation).

Utilizing heuristics, machine learning, and so forth, the element mapping engine may use identification of such context (e.g., the arrow bypassing the rectangular element 420B, the element 413 changing positions in each view, and so forth) to determine that the rectangular element 420B is indeed an intermediate state representing a transition/animation that is to be performed from a first UI view corresponding to the rectangular element 410B to a second UI view corresponding to the rectangular element 430B.

Figure 5A:
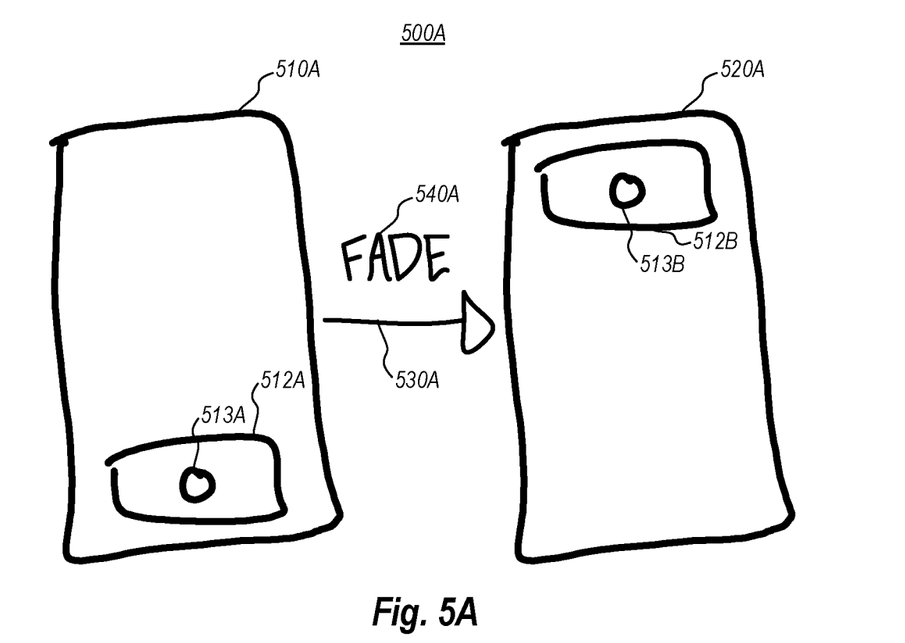
FIGS. 5A and 5B illustrate another example of identified transitions based on free hand input.
Figure 5B:
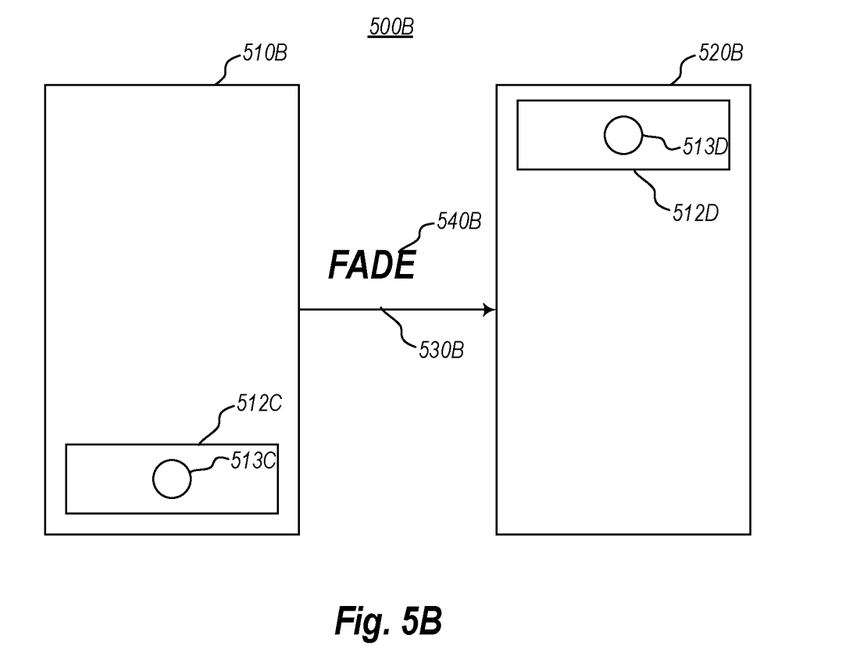

FIGS. 5A and 5B illustrate another embodiment for identifying transitions (e.g., animations) from a first identified UI view to a second identified UI view. Initially, the free hand input engine 412 may receive free hand input 500A as shown in FIG. 5A. Upon receiving the free hand input 500A, the free hand analysis engine 214 may identify that rectangle 510A comprises a large rectangular element 510B having small rectangular element 512C and small circular element 513C, rectangle 520A comprises a large rectangular element 520B having small rectangular element 512D and small circular element 513D, arrow 530A comprises formalized arrow element 530B, and text 540A comprises "FADE" text element 540B. These recognized elements (e.g., large rectangular element 510B, small rectangular element 512C, and so forth) may then be analyzed by the element mapping engine to identify both one or more UI objects and transitions between UI objects that were identified as comprising a UI view.

Initially, the element mapping engine may identify UI objects associated with the identified elements (e.g., rectangular element 510B, rectangular element 512C, and so forth), as further described herein. Using FIG. 5B as an example, the element mapping engine may then identify that the rectangular element 510B and rectangular element 5200B both correspond to UI objects comprising a view, while the arrow 530B represents a transition from a first view corresponding to the large rectangular element 510B to a second view corresponding to the large rectangular element 520B based on an intelligent (e.g., heuristics, machine learning, and so forth) analysis of the identified elements by the element mapping engine and free hand conversion computer system.

Additionally, the element mapping engine may use such intelligent analysis to identify that the formalized text 540B comprises the word "FADE", and may further interpret the formalized text 540 as describing a type of animation (e.g., a fading animation) that is to be performed as part of the transition from the first view (i.e., corresponding to the element 510B) to the second view (i.e., corresponding to the element 520B). Notably, while a fading animation is discussed with respect to the previous example, the element mapping engine may be configured to identify essentially any type of animation known in the art, including exit and entrance animations such as zoom animations, disappear animations, bouncing animations, transparency animations, darkening animations, fly-in animations, float-in animations, and so forth. Regardless of the type of animation used/identified (or whether an animation is even used), the element mapping engine may link UI views, such that the code generation engine may utilize such links to ensure that UI views transition from one UI view to another UI view in proper order, as further described herein. In some embodiments, such linking may be performed through the use of metadata that informs the code generation engine to which (if any) other UI views each identified UI view is linked.

Accordingly, the element mapping engine may utilize heuristics, machine learning, and so forth to identify both UI object types (e.g., views, buttons, and so forth) corresponding to recognized elements and transitions/animations between UI objects comprising UI views based on any relevant context, including positioning of elements (e.g., in relation to other shapes), types of elements (e.g., types of shapes, sizes of shapes, text, definition of received text, and so forth), metadata (e.g., probability metadata, characteristic metadata, and so forth), and so forth. Notably, using heuristics and/or machine learning, the free hand conversion computer system and/or the element mapping engine may also continue to improve identification of transitions/animations, as well as types of UI objects to be associated with identified elements.

Upon recognition of UI objects associated with formalized elements (and/or transitions associated with the recognized UI objects), the UI objects may be stored/saved for possible future changes and/or for converting the stored saved UI objects into platform-specific code. In an example, identified UI objects based on received free hand input may be stored in the form of a graph/tree. For instance, each identified UI object that comprises a view (e.g., rectangular element 310B) may be stored (e.g., within memory, on disk, and so forth) as a tree having one or more child nodes (e.g., buttons, text boxes, and so forth that are included within the view). In circumstances when more than one view is identified as being created based on received free hand input, a tree that includes each created view and the UI objects within those views may also be created/stored (i.e., a tree of view trees).

Once each UI object (e.g., views, text boxes, buttons, and so forth) associated with recognized elements (and ultimately received free hand input) has been identified (and potentially stored), the code generation engine 220 may convert the UI objects into platform-specific UI objects. For instance, generic UI objects may be converted into AXML-ANDROID, NIB's-IOS, EXTENSIBLE APPLICATION MARKUP LANGUAGE (XAML)-WINDOWS, or any other applicable platform-specific code. As discussed more fully herein, the identified UI objects for each recognized element may comprise generic UI objects (e.g., generic views, generic buttons, and so forth), which generic UI objects may then be converted into platform-specific UI objects. In a more particular example, generic views having generic buttons and generic text boxes may be converted into particular AXML views, AXML buttons, and AXML text boxes. Accordingly, the free hand conversion computer system may allow a user to select one or more platforms into which the user would like UI objects based on free hand input of the user to be converted. Notably, such platform-specific UI objects may also include colors, line widths, font types, font sizes, and so forth, that match the corresponding free hand input received.

The code generation engine may also be configured to utilize identified transitions (whether or not animations are included), such that identified UI views are logically linked to other UI views in a proper order. For instance, as briefly described, the element mapping engine may generate link metadata associated with each UI view that defines the UI view(s) to which each identified UI view is linked. Regardless of how linking is performed, linking may allow for automatically maintaining proper order when transitioning from a first view to a second view (a second view to a third view, and so forth) once platform-specific UI code has been generated based on generic UI objects. In some embodiments, the code generation engine may generate a single file that includes all generated platform-specific UI code (i.e., all created UI views). In other embodiments, the code generation engine may generate a file for each UI view corresponding to generated platform-specific UI code. In such embodiments, each file may be logically linked to account for transitions from a given UI view (i.e., included within a single file) to any other given UI view (i.e., also included within a single, separate file). Additionally, animation information may be included within single files created for all views, single files created for each separate view, or separately generated animation files (i.e., files generated solely for animations).

In some embodiments, at least portions of the free hand conversion computer system may be implemented using a standalone software application. In other embodiments, at least portions of the computer system may be implemented using an integrated development environment (IDE). Notably, such software (i.e., standalone or IDE) may allow a user to select different types of input free hand input. For instance, a user may be able to select an option for generating free hand input (e.g., free hand strokes) that is analyzed to create elements, UI objects, and ultimately platform-specific UI code. In another example, users may be able to also select a constraints input that allows a user to align identified elements, fill identified elements, and so forth.

Additionally, a live preview may be provided to users, such that a user can instantaneously (or almost instantaneously) view UI objects corresponding to free hand input generated by the user. In an example, a user that generates free hand input 300A may instantaneously view UI objects that have been identified and generated based on the received free hand user input similar to the displayed formalized elements illustrated with respect to FIG. 3B. (i.e., the identified/generated UI objects may look similar to the identified elements illustrated in FIG. 3B). In this way, a user may manipulate (e.g., erase and re-draw portions of the free hand input) the free hand input to view how the free hand conversion computer system is interpreting the user's free hand input in the form of identified/generated UI objects and transitions/animations between identified/generated UI views. In some embodiments, such live previews may be displayed in a dual pane format, in a carousel format, a tabular format, or any other applicable format.

Additionally, regardless of whether the free hand conversion computer system includes an implementation using a standalone software application, an IDE, or both, a user may be able to continue editing any generated platform-specific UI code. For example, assume the free hand conversion computer system has generated platform-specific UI code in response to received free hand input. The generated platform-specific UI code may then be displayed and further refined/edited by a developer (e.g., within an IDE), just as the developer would normally edit such UI code when created by any other means. More particularly, the user would be able to modify colors, line width, font, and so forth. In this way, based initially on free hand input, platform-specific UI code may be generated (and potentially later refined/edited) to be used as a UI for a software application that is executable on a selected platform.

Notably, while the free hand conversion computer system 210 has been described as first analyzing free hand input to identify elements (i.e., shapes, text, and so forth) associated with received free hand input and then identifying UI objects based on the identified elements, in some embodiments, the free hand conversion computer system 210 may refrain from identifying elements/shapes associated with received free hand input that are then used to identify corresponding UI objects. Instead, in such embodiments, the free hand conversion computer system may skip the element identification step and immediately proceed to identifying UI objects (e.g., views, text boxes, and so forth) based on received free hand input.

Figure 6:
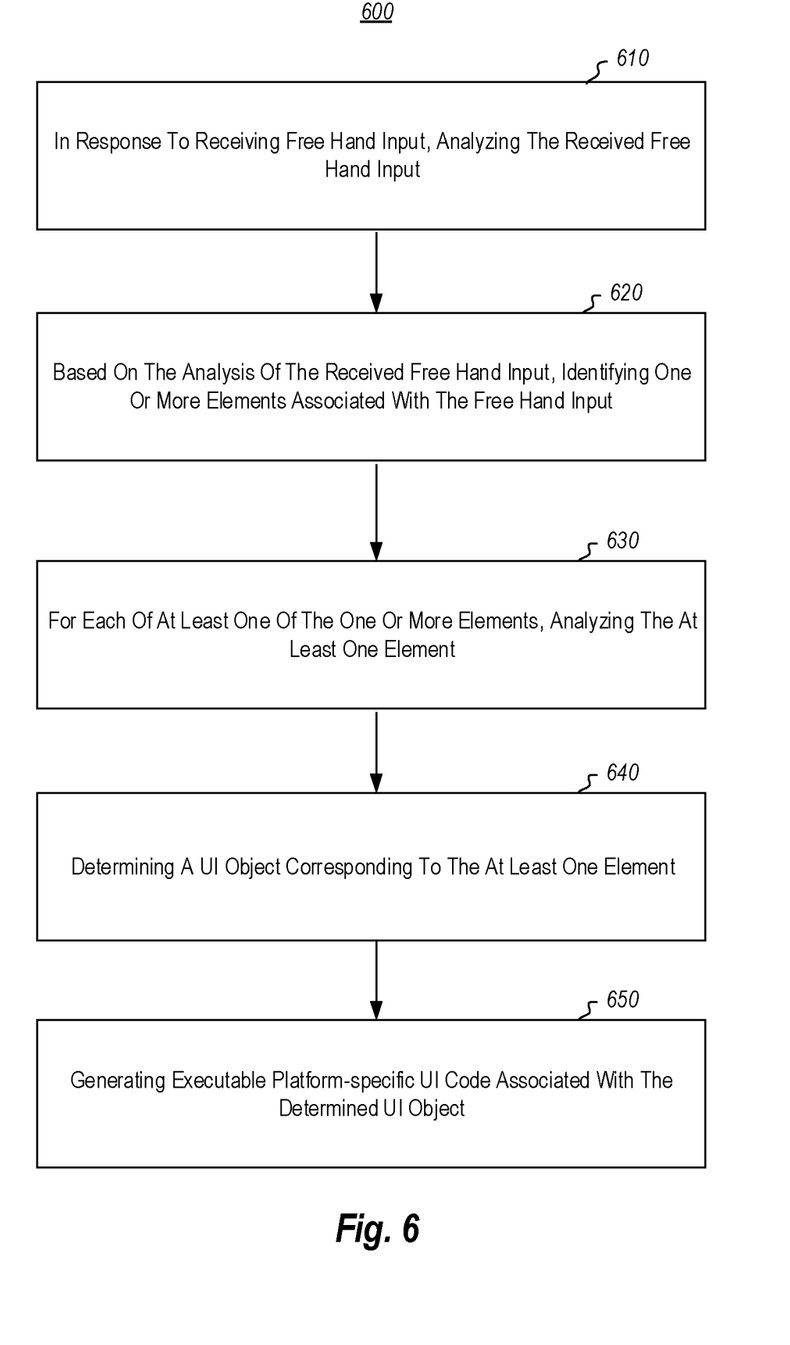
FIG. 6 illustrates a flowchart of a method for generating platform-specific UI objects based on received free hand input.

FIG. 6 illustrates a flowchart of a method 600 for generating platform-specific UI objects based on received free hand input. The method 600 is described with frequent reference to the environment 200 of FIG. 2 and the example free hand input and elements of FIGS. 3A and 3B. The method 600 includes, in response to receiving free hand input, analyzing the received free hand input (Act 610). For instance, the free hand input engine 212 may receive the free hand input 300A of FIG. 3A. The method 600 may further include, based on the analysis of the received free hand input, identifying one or more elements associated with the free hand input (Act 620). For example, the free hand analysis engine 214 may analyze the free hand input 300A to identify the elements (i.e., elements 310B through 318B) illustrated in FIG. 3B. The method 600 may also include, for each of at least one of the one or more elements, analyzing the at least one element (Act 630). For instance, the element mapping engine may analyze the identified elements 310B through 318B to determine/identify corresponding UI objects.

The method 600 may further include determining a UI object corresponding to the at least one element (Act 640). For instance, based on the analysis of the elements 310B through 318B, the element mapping engine may determine that the element 310B comprises a UI view, that the element 312B comprises a login text box that can receive user input, that the element 314B comprises a password text box that can receive user input, and that the element 316B in combination with the element 318B comprise a user selectable button. Such determination of elements may be based at least partially on analyzing context associated with identified elements 310B through 318B, as further described herein. The method 600 may further include generating executable platform-specific UI code associated with the determined UI object (Act 650). For example, the code generation engine may utilize the determined/identified UI objects to generate platform-specific UI code based on the UI determined/identified UI objects. Such platform-specific UI code may generated for any particular platform and may be further edited (e.g., within an IDE) as UI code created in any other way could be edited.

In this way, free hand input, such as free hand strokes (e.g., with a stylus) at a touchscreen, may first be analyzed to identify elements (e.g., shapes, text, and so forth). These elements may then be analyzed to identify UI objects corresponding to the identified UI elements, which identified UI objects may then be utilized to generate platform-specific UI code. Accordingly, the principles described herein comprise a technical solution (i.e., based on analysis of received free hand input, identifying elements, followed by identifying UI objects, and eventually generating platform-specific UI code that is usable to create/refine UI's for software applications to be executed on a particular platform) to a technical problem that includes allowing users (e.g., designers) to automatically create platform-specific UI code based on prototypes/sketches.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system comprising:
   one or more processors; and
   one or more computer-readable storage media having stored thereon computer-executable instructions that are executable by the one or more processors to cause the computer system to generate platform-specific user interface (UI) objects based on received free hand input, the computer-executable instructions including instructions that are executable to cause the computer system to perform at least the following:
   in response to receiving free hand input, perform at least the following:
      analyze the received free hand input;
      based on the analysis of the received free hand input, identify one or more elements associated with the free hand input; and
      for each of at least one element of the one or more elements, perform at least the following:
         analyze the at least one element;
         determine a UI object corresponding to the at least one element;
         determine a platform for which platform-specific UI code is to be generated, based on user input selecting the platform from a plurality of different platforms that the user would like the UI object based on the received free hand input to be converted into;
         generate executable platform-specific UI code associated with the determined UI object based at least in part on the user input selecting the platform;
         render the platform-specific UI code in a modifiable format within an application interface;
         receive user input at the application interface for modifying the platform-specific UI code to modify a characteristic of the UI object corresponding to the at least one element; and
         modify the platform-specific UI code.

2. The computer system in accordance with claim 1, wherein the free hand input comprises receiving one or more free hand strokes from a user at the computer system.

3. The computer system in accordance with claim 2, wherein the one or more free hand strokes comprise input generated via at least one of an active stylus or a passive stylus.

4. The computer system in accordance with claim 1, wherein the free hand input comprises receiving an image of one or more free hand sketches of a user.

5. The computer system in accordance with claim 1, wherein identifying one or more elements comprises identifying one or more shapes corresponding to the freehand user input.

6. The computer system in accordance with claim 1, wherein identifying one or more elements comprises identifying one or more portions of text corresponding to the freehand user input.

7. The computer system in accordance with claim 1, wherein analyzing the at least one element comprises analyzing a context of the one or more elements.

8. The computer system in accordance with claim 7, wherein analyzing the context of the at least one element comprises analyzing at least one of a relative positioning of the at least one element in relation to each of the one or more elements, probability metadata associated with the at least one element, and a type of element of the at least one element.

9. The computer system in accordance with claim 1, wherein the determined UI object comprises a generic UI object.

10. The computer system in accordance with claim 1, wherein the determined UI object comprises at least one of a generic view, a generic text box, and a generic user selectable button.

11. The computer system in accordance with claim 1, wherein determining the UI object corresponding to the at least one element comprises determining one or more transitions or animations between UI views corresponding to the freehand user input.

12. A method, implemented at a computer system that includes one or more processors, for generating platform-specific user interface (UI) objects based on received free hand input, comprising:
   in response to receiving free hand input, performing at least the following:
      analyzing the received free hand input;
      based on the analysis of the received free hand input, identifying one or more elements associated with the free hand input; and
      for each of at least one element of the one or more elements, performing at least the following:
         analyzing the at least one element;
         determining a UI object corresponding to the at least one element;
         determining a platform for which platform-specific UI code is to be generated, based on user input selecting the platform from a plurality of different platforms that the user would like the UI object based on the received free hand input to be converted into;
         generating executable platform-specific UI code associated with the determined UI object based at least in part on the user input selecting the platform;
         rendering the free hand input of that at least one element concurrently with a UI object on a dual-pane interface to compare the free hand input of that at least one element with the UI object;
         rendering the platform-specific UI code in a modifiable format within an application interface
         receiving user input at the application interface for modifying the platform-specific UI code to modify a characteristic of the UI object corresponding to the at least one element; and
         modifying the platform-specific UI code.

13. The method in accordance with claim 12, wherein the free hand input comprises receiving one or more free hand strokes from a user at the computer system.

14. The method in accordance with claim 13, wherein the one or more free hand strokes comprise input generated via at least one of an active stylus or a passive stylus.

15. The method in accordance with claim 12, wherein the free hand input comprises receiving an image of one or more free hand sketches of a user.

16. The method in accordance with claim 12, wherein identifying one or more elements comprises identifying one or more shapes corresponding to the freehand user input.

17. The method in accordance with claim 12, wherein identifying one or more elements comprises identifying one or more portions of text corresponding to the freehand user input.

18. The method in accordance with claim 12, wherein analyzing the at least one element comprises analyzing a context of the one or more elements.

19. The method in accordance with claim 18, wherein analyzing the context of the at least one element comprises analyzing at least one of a relative positioning of the at least one element in relation to each of the one or more elements, probability metadata associated with the at least one element, and a type of element of the at least one element.

20. The method in accordance with claim 12, wherein the determined UI object comprises a generic UI object.

21. The method of claim 12, wherein the computer-executable instructions further include instructions that are executable to cause the computer system to:
render the platform-specific UI code in a modifiable format within an application interface configured for modifying the platform-specific UI;
receive user input for modifying the platform-specific UI code; and
modify the platform-specific UI code.

22. The method of claim 12, wherein the platform-specific UI code is rendered concurrently with a rendering of the UI object corresponding to the at least one element.

23. A computer program product comprising one or more computer-readable hardware storage devices having stored thereon computer-executable instructions that are executable by one or more processors of a computer system to cause the computer system to generate platform-specific user interface (UI) objects based on received free hand input, the computer-executable instructions including instructions that are executable to cause the computer system to perform at least the following:
in response to receiving free hand input, perform at least the following:
analyze the received free hand input;
based on the analysis of the received free hand input, identify one or more elements associated with the free hand input; and
for each of at least one element of the one or more elements, perform at least the following:
analyze the at least one element;
determine a UI object corresponding to the at least one element;
determine a platform for which platform-specific UI code is to be generated, based on user input selecting the platform from a plurality of different platforms that the user would like the UI object based on the received free hand input to be converted into;
generate executable platform-specific UI code associated with the determined UI object based at least in part on the user input selecting the platform;
render the free hand input of that at least one element concurrently with a UI object on a dual-pane interface to compare the free hand input of that at least one element with the UI object;
render the platform-specific UI code in a modifiable format within an application interface;
receive user input for modifying the platform-specific UI code to modify a characteristic of the UI object corresponding to the at least one element; and
modify the platform-specific UI code.

24. The computer program product of claim 23, wherein analyzing the context of the at least one element comprises analyzing at least one of a color, a line width, a font type or a font size of the at least one element.

* * * * *